(12) United States Patent
Randhawa et al.

(10) Patent No.: US 11,931,703 B1
(45) Date of Patent: Mar. 19, 2024

(54) AERATION EQUIPMENT FOR WASTEWATER TREATMENT

(71) Applicants: Satvinder Pal Singh Randhawa, Chandigarh (IN); Oriana Risa Randhawa, Orangevale, CA (US)

(72) Inventors: Satvinder Pal Singh Randhawa, Chandigarh (IN); Oriana Risa Randhawa, Orangevale, CA (US)

(*) Notice: Subject to any disclaimer, the term of this patent is extended or adjusted under 35 U.S.C. 154(b) by 0 days.

(21) Appl. No.: 18/260,337

(22) PCT Filed: Apr. 26, 2022

(86) PCT No.: PCT/IN2022/050392
§ 371 (c)(1),
(2) Date: Jul. 5, 2023

(87) PCT Pub. No.: WO2022/229977
PCT Pub. Date: Nov. 3, 2022

(30) Foreign Application Priority Data

Apr. 27, 2021 (IN) .............................. 202111019349

(51) Int. Cl.
*B01F 3/04* (2006.01)
*B01F 23/233* (2022.01)

(52) U.S. Cl.
CPC .... *B01F 23/23314* (2022.01); *B01F 23/2333* (2022.01); *B01F 23/23353* (2022.01)

(58) Field of Classification Search
CPC ............ B01F 23/23314; B01F 23/2333; B01F 23/23353

USPC ............................................................. 261/87
See application file for complete search history.

(56) References Cited

U.S. PATENT DOCUMENTS

| | | | | |
|---|---|---|---|---|
| 1,445,935 A | * | 2/1923 | Daman et al. ........... | B03D 1/16 261/87 |
| 2,198,143 A | * | 4/1940 | Weinig ................... | B03D 1/028 261/87 |
| 3,722,679 A | * | 3/1973 | Logue ................... | B01F 25/211 261/87 |
| 4,188,287 A | * | 2/1980 | Faulkner ............... | B03D 1/245 261/87 |
| 4,231,974 A | * | 11/1980 | Engelbrecht ........... | C02F 3/207 261/87 |
| 4,249,828 A | * | 2/1981 | Condolios ........... | B01F 33/4021 366/169.2 |
| 5,738,807 A | * | 4/1998 | Moon ..................... | B01F 25/64 261/87 |
| 6,712,980 B1 | * | 3/2004 | Ahlstrom ............ | B01F 23/2331 261/87 |
| 8,109,488 B2 | * | 2/2012 | Young ............... | B01F 23/23421 261/36.1 |

* cited by examiner

Primary Examiner — Charles S Bushey

(57) ABSTRACT

A submersible aeration equipment (10) for wastewater treatment in which partial vacuum is generated by the rotation of the impellers (22) within the water, which results in the formation of micro-bubbles. The submersible aeration equipment (10) includes a spring-based air intake valve (18) that can control the flow of air through a hollow shaft (12), wherein the opening of the spring-based air intake valve (18) is based on the amount of vacuum in the hollow shaft (12).

6 Claims, 2 Drawing Sheets

AERATION EQUIPMENT FOR WASTEWATER TREATMENT

FIELD OF INVENTION AND USE OF INVENTION

The invention relates to an aeration equipment for wastewater treatment, and more particularly, the invention relates to an aeration equipment with multiple impellers for increasing or decreasing aeration capacity and an air control valve.

PRIOR ART AND PROBLEM TO BE SOLVED

Wastewater aeration is the process of adding Oxygen to wastewater to allow aerobic biodegradation of the pollutants in the wastewater. The aeration brings water and air in close contact to remove dissolved gasses and oxidize metals in the wastewater.

A range of aerators are known in the art for wastewater treatment. Fine bubble diffusers that use compressors are known in the art for wastewater aeration. The bubble formation is considered essential for increasing air-water contact promoting the transfer of oxygen in the water. However, the bubble size produced from bubble diffusers is large which rapidly rises to the surface and their oxygen is lost in the atmosphere.

Submersible aerators are also known in which bubbles are created under partial vacuum which on entering the water collapse under high water pressure. These include impellers driven by a motor, wherein a hollow shaft connects the impellers to the motor. The hollow shaft also acts as an air tube that has air intake orifices in the motor shaft coupling and similar orifices near the impellers. The vacuum generated by the submersible impellers draws air through the orifices and the air tube. The drawback of such aerators is that the amount of bubble formation is very less.

A need is therefore appreciated for aeration equipment for wastewater treatment that can produce microbubbles at the desired rate for improved aeration efficiency and without the need for changing the whole equipment for just changing the bubble formation rate.

OBJECTS OF THE INVENTION

An object of this invention is, therefore, to provide an aeration equipment for liquids in which the number of impellers can be varied.

It is an object of the present invention that the bubble of exceedingly small size can be dispersed in the liquid.

It is an object of the present invention to increase the bubble rate formation.

It is an object of the present invention that the aeration equipment is economical to manufacture and operate.

BRIEF DESCRIPTION OF DRAWINGS

The accompanying figures, which are incorporated herein, form part of the specification and illustrate embodiments of this invention. Together with the description, the figures further serve to explain the principles of this invention and to enable a person skilled in the relevant arts to make and use the invention.

DESCRIPTION OF THE INVENTION

Disclosed is self-aspirating aeration equipment including a hub to which multiple impellers can be interchangeably and variably coupled. Increasing the number of impellers can increase the amount of vacuum and thus the volume of bubbles generated. The bubbles produced in a vacuum/partial vacuum are ultrafine in size. The hub is connected to a motor through a hollow shaft. A motor shaft coupling can couple the shaft to the motor. The motor shaft coupling includes orifices for drawing air from the atmosphere. An air control valve can be provided in the shaft that can control the volume of air intake into the shaft from the orifices in a partial vacuum state onto the motor shaft coupling to the orifices adjacent to the impellers at the bottom end of the shaft.

The vacuum generated depends upon several factors such as the number of impellers, rpm of motor, and density of sludge. The air intake vacuum should be critically controlled within a certain range based on changes in the number of impellers, rpm of motor, and density of sludge. The vacuum can be a spring-based valve that opens based on the vacuum generated. The valve can open incrementally based on the increasingly generated vacuum. The opening of the valve and thus the volume of air intake is proportional to the vacuum generated by the impellers leading to an increased amount/density of ultrafine bubbles.

Figure 1:
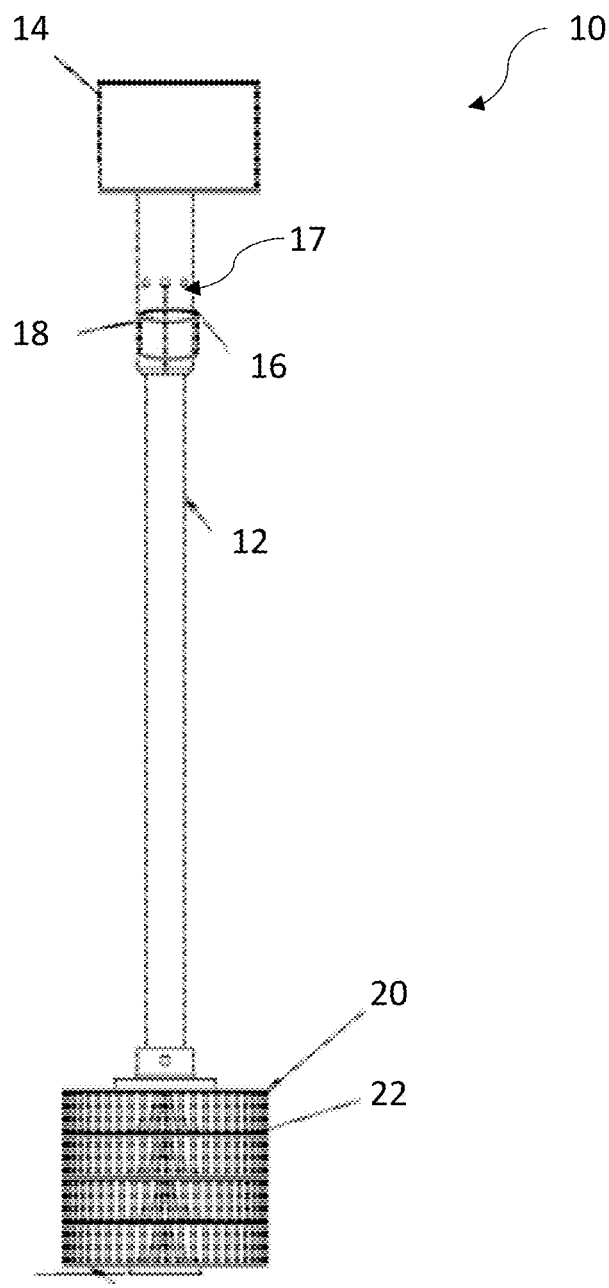
FIG. 1 is a planar view of the aeration equipment, in accordance with an exemplary embodiment of this invention.

Referring to FIG. 1 which shows an exemplary embodiment of the aeration equipment which is submersible aeration equipment for generating gas bubbles in a liquid, such as sludge. The disclosed aeration equipment 10 can be used in wastewater treatment for the activation of sludge by generating nanobubbles. The aeration equipment 10 includes a hollow shaft 12 that has a proximal end and a distal end. To the proximal end of the hollow shaft 12 can be coupled a shaft coupling 16 and to the distal end of the hollow shaft 12 can be coupled a hub 20. The hollow shaft can be made from a rigid and durable material, such as metal. The length of the hollow shaft can be of a standard size for a submersible aerator. The disclosed aeration equipment 10 is submersible, wherein a longitudinal axis of the hollow shaft 12 can be perpendicular to the water.

The shaft coupling 16 can be a hollow tube that couples the hollow shaft 12 to a motor 14. The motor 14 can be an electrical motor that can rotate the hollow shaft 12 in a clockwise or anticlockwise direction. The motor 14 can be a variable speed motor, such that the speed of the motor 14 can be varied using suitable controls. It is understood however that any other type of motor, electrically or mechanically driven that is known to a skilled person for use in rotating a shaft can be used without departing from the scope of the present invention.

The shaft coupling 16 can be in fluid communication with the hollow shaft 12. The shaft coupling 16 can include one or more apertures 17 that can draw air from outside, and the air can be drawn from outside through one or more apertures and into the hollow shaft 12. The shaft coupling 16 can further include a spring-based air control valve 18 that forms a barrier between the one or more apertures 17 and the hollow shaft 16. The spring-based air control valve 18 can prevent the flow of air from the one or more apertures 17 into the hollow shaft 12. The spring-based air control valve 18 is encased with the shaft coupling 16 blocking the one or more apertures 17 from inside of the shaft coupling 16.

The spring-based air control valve 18 can open due to vacuum in the hollow shaft 12, wherein the spring-based air control valve 18 can open incrementally based on the increase in the applied vacuum, i.e., opening of the spring-based air control valve 18 can be proportional to the applied vacuum. The tension of the springs in the spring-based air control valve 18 can be manipulated to control the rate of opening of the spring-based air control valve 18 based on applied vacuum. The opening of the spring-based air control valve 18 may result in the intake of the air from outside and through one or more apertures 17. The air can flow into the hollow shaft, wherein the amount of air flowing into the hollow shaft 12 can be proportional to the opening of the spring-based air control valve 18.

Figure 2:
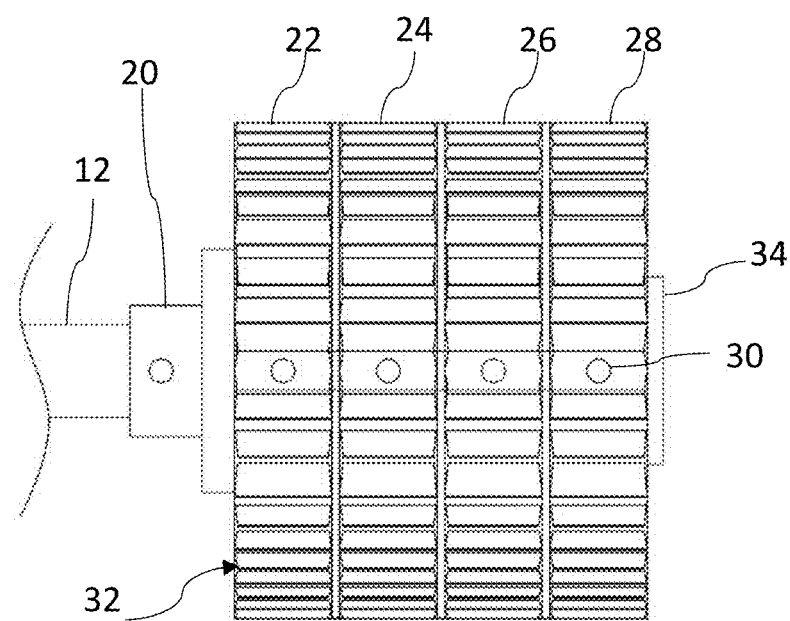
FIG. 2 is an enlarged view of the hub showing serrations on the edges of the impellers and air output apertures in the hollow tube of the hub, in accordance with an exemplary embodiment of this invention.

The hub 20 can include impellers 22 that are driven by the rotating hollow shaft 12. The number of impellers in the hub can be varied. Moreover, the hub can be interchangeably mounted to the distal end of the hollow shaft 12. Referring to FIG. 2 which shows an enlarged view of the hub and the impellers. The hub 20 can include a hollow tube 34 that can be connected to the distal end of the shaft such that air from the hollow shaft can flow into the hollow tube of the hub. The hollow tube of the hub can include output apertures 30 through which the air can flow out. Several such apertures can be provided in the hollow tube of the hub spaced apart from each other. FIG. 2 shows four impellers 22, 24, 26, and 28 mounted to the hub. The number of impellers can be varied. Rotation of the impellers in the water results in the formation of a partial vacuum adjacent to the hub. The partial vacuum results in the drawing of air from the hollow shaft 12, thus creating a vacuum in the hollow shaft. The vacuum in the hollow shaft results in the opening of the spring-based air control valve 18, and thus flow of air from above the water surface, through the hollow shaft, and out through the apertures in the hollow tube of the hub. The amount of air that can flow through the hollow shaft is critical for the formation of the partial vacuum and thus the formation of the bubbles. The size and volume of the bubbles generated because of the partial vacuum around rotating impellers can also be proportional to the rate of flow of air through the hollow shaft 12.

The number of impellers can be increased and decreased to manipulate the partial vacuum, and thus the formation of bubbles. Increasing the number of impellers can result in more vacuum in the hollow shaft 12 and the opening of the spring-based air control valve 18 can increase proportionally, and thus more air can flow into the hollow shaft. Thus, the number of impellers can be varied without changing the whole equipment. In certain implementations, the tension of the spring-based air control valve 18 can be adjusted/calibrated, and thus the opening of the spring-based air control valve 18 in response to the addition or removal of impellers can be fined tuned, as and when desired.

Again, referring to FIG. 2 which shows the edges of the impellers that have serrations 32. The serrations can be provided in any pattern along the edges of the impellers. The serrations 32 can increase the rate of bubble formation and decreases the size of generated bubbles.

We claim:

1. An aeration equipment (10) for wastewater treatment, the aeration equipment comprises:
   a hollow shaft (12) that has a proximal end and a distal end;
   a shaft coupling (16) coupled to the proximal end of the hollow shaft (12), the shaft coupling (16) is of a hollow cylindrical shape, one or more apertures (17) in a wall of the shaft coupling (16), the one or more apertures (17) are configured to receive air from outside, wherein the air flows into the hollow shaft (12);
   an air control valve (18) encased within the shaft coupling (16), the air control valve (18) forms a barrier between the one or more apertures (17) and the hollow shaft (12), wherein the air control valve (18) is configured to open under vacuum resulting in flow of air through the one or more apertures (17) and into the hollow shaft (12); and
   a hub (20) interchangeably coupled to a distal end of the hollow shaft (12), the hub (20) comprises:
   a hollow tube 34 coupled to the distal end of the hollow shaft (12), the hollow tube (34) has one or more output apertures (30), wherein the air from the hollow shaft (12) flows out through the one or more output apertures (30); and
   a plurality of impellers (22) mounted to the hollow tube (34) of the hub (20), the plurality of impellers (22) configured to generate the vacuum in the hollow shaft (12) upon being rotated in water.

2. The aeration equipment (10) of claim 1, wherein the aeration equipment (10) further comprises a motor, the motor operably coupled to the shaft coupling (16).

3. The aeration equipment (10) of claim 1, wherein the plurality of impellers (22) are interchangeably and variably coupled to hollow tube (34).

4. The aeration equipment (10) of claim 1, wherein the air control valve (18) is spring based, wherein the opening of the air control valve (18) is proportional to an amount of the vacuum generated in the hollow shaft (12), wherein the amount of the vacuum generated in the hollow shaft (12) is proportional to a number of impellers (22) on the hub (20).

5. The aeration equipment (10) of claim 4, wherein the air control valve (18) is configured to incrementally open with increasing vacuum generated in the hollow shaft (12).

6. A method for wastewater treatment, the method comprising the steps of:
   providing an aeration equipment (10) for wastewater treatment, the aeration equipment comprises:
   a hollow shaft (12) that has a proximal end and a distal end,
   a shaft coupling (16) coupled to the proximal end of the hollow shaft (12), the shaft coupling (16) is of a hollow cylindrical shape, one or more apertures (17) in a wall of the shaft coupling (16), the one or more apertures (17) configured to receive air from outside, wherein the air flows into the hollow shaft (12),
   an air control valve (18) encased within the shaft coupling (16), the air control valve (18) forms a barrier between the one or more apertures (17) and an inner volume of the hollow shaft (12), wherein the air control valve (18) configured to open under vacuum resulting in flow of air through the one or more apertures (17) and into the hollow shaft (12),
   a hub (20) interchangeably coupled to a distal end of the hollow shaft (12), the hub (20) comprises a hollow tube 34 coupled to the distal end of the hollow shaft (12), the hollow tube (34) has one or more output apertures (30), wherein the air from the hollow shaft (12) flows out through the one or more output apertures (30), and
   a plurality of impellers (22) mounted to the hollow tube (34) of the hub (20), the plurality of impellers (22) are configured to generate the vacuum in the hollow shaft (12) upon being rotated in water.

* * * * *